No. 706,036. Patented Aug. 5, 1902.
W. P. DUN LANY.
HAIR FASTENER.
(Application filed June 18, 1900.)
(No Model.)

Witnesses.
E. B. Gilchrist
F. D. Ammen

Inventor:
William P. Dun Lany,
By his Attorneys,
Thurston & Bates

UNITED STATES PATENT OFFICE.

WILLIAM P. DUN LANY, OF CLEVELAND, OHIO.

HAIR-FASTENER.

SPECIFICATION forming part of Letters Patent No. 706,036, dated August 5, 1902.

Application filed June 18, 1900. Serial No. 20,680. (No model.)

*To all whom it may concern:*

Be it known that I, WILLIAM P. DUN LANY, a citizen of the United States, residing at Cleveland, in the county of Cuyahoga and State of Ohio, have invented a certain new and useful Improvement in Hair-Pins, of which the following is a full, clear, and exact description, reference being had to the accompanying drawings.

The object of my invention is to provide a hair-pin which shall remain in the hair as long as desired.

As is well known, the hair-pins made of celluloid, tortoise-shell, hard rubber, &c., which are now largely in use, have a great tendency to drop out of the hair. They have been formed in various shapes to prevent this, but without much success. I have found that by providing such hair-pins with a sheathing of soft rubber for a small portion of their length they will remain in the hair by reason of the adhesive character of the soft rubber; and the present invention consists, broadly, of a hair-pin having such soft-rubber sheathing. In embodying the invention I find it very desirable to secure the rubber sheathing on the pin by making an annular recess about each tine of the pin and having the rubber in the form of short tubes adapted to occupy such recesses, and the invention includes a pin so made as well as the form herein shown and described.

Figure 1:
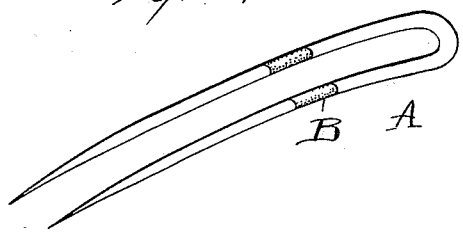
Figure 2:
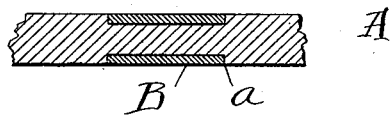
Figure 3:
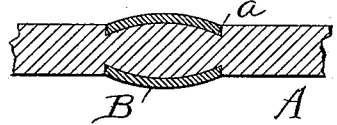
Figure 4:

In the drawings, Figure 1 is a perspective view of a hair-pin embodying my invention. The remaining figures are on an enlarged scale for the purpose of illustration. Fig. 2 is a fragmentary longitudinal section of one of the tines. Fig. 3 is a similar view of a modified form, and Fig. 4 is a perspective view of the rubber sheathing employed.

Referring to the parts by letters, A represents the pin itself, which, as stated, is preferably made of celluloid, tortoise-shell, hard rubber, or bone, or it may be made of aluminium or other hard material. Around each tine of this pin is formed an annular groove *a*. A short tube of soft rubber B is slipped over the tine until it seats in said annular groove. The depth of the groove *a* at its edges is substantially the same as the thickness of the rubber tube B, so that the edge of the tube is flush with the surface of the pin. I find this is desirable, so that the pin may be easily slipped into place. The groove may be of the same depth throughout, so that the entire outer surface of the sheathing is alined with the outer surface of the pin, as shown in Fig. 2. In some cases, however, as where the hair is thin, it is desirable to have a pin obtain more of a hold upon it than would the form shown in Fig. 2, and in that case I make the recess of less depth intermediately than it is at the edges, so as to bow out the soft-rubber sheathing, as shown in Fig. 3. As shown in this figure, the bottom of the recess is substantially tangent to the outer surface of the pin; but the recess at its ends is of sufficient depth so that the edges of the rubber sheathing are still flush with the surface of the tine.

I am aware that it has been proposed to cover iron or steel pins with a coating of woolly material to hold them within the hair; but such coating does not accomplish the result which my invention seeks to provide, for it is liable to become entangled in the hair, pulling the hair out when the pin is removed or sticking to the hair in preference to the pin, and it necessarily collects dirt when not in use. Moreover, it is not adaptable to the smooth glossy surface of the celluloid, &c., pins now so largely used. My invention does not rely on the roughness of the material employed to hold it in the hair, but on the adhesive character peculiar to soft rubber.

Having described my invention, I claim—

1. The combination of a hair-pin having a depression about its tine, with a piece of seamless elastic rubber tubing having a smaller internal diameter than the external diameter of the tine and adapted to be slipped upon the tine and seated in said depression, substantially as described.

2. A hair-pin having an annular recess about its tine which recess is deeper at its edges than intermediately, combined with a removable sheathing consisting of a soft-rubber tube which surrounds the tine and occupies said recess, substantially as described.

In testimony whereof I hereunto affix my signature in the presence of two witnesses.

WILLIAM P. DUN LANY.

Witnesses:
F. D. AMMEN,
ALBERT H. BATES.